(12) United States Patent
Wang

(10) Patent No.: US 8,218,086 B2
(45) Date of Patent: Jul. 10, 2012

(54) FLASH DETECTION

(75) Inventor: Zhicheng Lancelot Wang, Los Altos, CA (US)

(73) Assignee: Ericsson Television Inc., Duluth, GA (US)

( * ) Notice: Subject to any disclaimer, the term of this patent is extended or adjusted under 35 U.S.C. 154(b) by 1245 days.

(21) Appl. No.: 12/001,320

(22) Filed: Dec. 11, 2007

(65) Prior Publication Data

US 2009/0147142 A1   Jun. 11, 2009

(51) Int. Cl.
*H04N 9/77* (2006.01)
(52) U.S. Cl. ......... 348/663; 348/371
(58) Field of Classification Search ......... 348/663, 348/701; 382/173, 239, 268
See application file for complete search history.

(56) References Cited

U.S. PATENT DOCUMENTS

| 4,179,188 | A | 12/1979 | Geckeler |
| 2004/0153937 | A1* | 8/2004 | Moon ......... 714/746 |
| 2006/0115167 | A1* | 6/2006 | Itokawa ......... 382/239 |
| 2006/0152634 | A1* | 7/2006 | Yeh et al. ......... 348/701 |
| 2007/0025615 | A1* | 2/2007 | Zhou et al. ......... 382/173 |
| 2007/0081588 | A1 | 4/2007 | Raveendran et al. |
| 2007/0189606 | A1 | 8/2007 | Ciuc et al. |
| 2009/0033764 | A1* | 2/2009 | Hung et al. ......... 348/229.1 |

OTHER PUBLICATIONS

International Search Report with Written Opinion, Feb. 5, 2009, 7 pages.

* cited by examiner

*Primary Examiner* — Tung Vo
*Assistant Examiner* — Obafemi Sosanya

(57) ABSTRACT

There is provided a method of pre-processing video data to detect flashes, comprising calculating a normalized difference index value for a Luminance [Y] component of the video data, calculating a normalized difference index value for Chrominance [U and V] components of the video data, calculating a normalized luminance [Y] mean gradient index for the video data, and providing an indication that a flash has been detected when all the following conditions are satisfied: the normalized difference index value for the Luminance [Y] component is greater than a first predetermined threshold ($T_Y$); the normalized difference index value for the Chrominance [U and V] components is less than a second predetermined threshold ($T_C$); and a difference between the normalized difference index value for the Chrominance [U and V] components and the normalized luminance [Y] mean gradient index is less than or equal to a third pre-determined threshold ($T_F$).

17 Claims, 1 Drawing Sheet

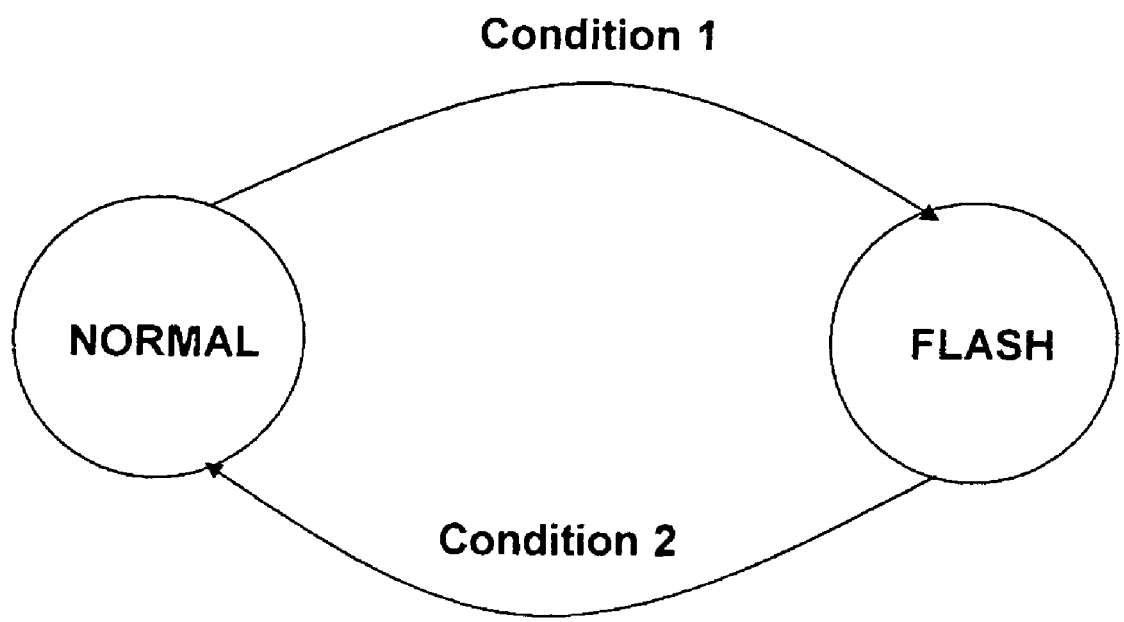

FLASH DETECTION

FIELD OF THE INVENTION

The invention relates to video coding in general, and in particular to a method of pre-processing video data to detect flashes.

BACKGROUND

Motion-compensated predictive video compression exploits the similarity of successive pictures by making predictions from previously coded pictures. The pictures from which the predictions are taken can come from the past (forward prediction) or the future (backward prediction) or a combination of the two (bi-directional prediction), thus enabling the prediction of uncovered areas. Therefore, state-of-the-art video compression engines can cope with most types of motion and critical picture material, but the coding of each image in the sequence is clearly dependent on that of its neighbours.

However, there are effects which can cause severe picture degradation and are worthy of special mitigating treatment. One such effect arises during coding of video sequences that contain short, bright flashes, such as those that occur when a still camera with a flash gun attached is used in the field of view, or strobing is present in the scene (e.g. a movie set in a nightclub, or muzzle flashes of a gun). Predictive coding during a group of pictures where some of these pictures are affected by short, bright flashes leads to poor compression performance.

This is because the statistical analysis used in flash detection is closely related to that used for scene change during typical video encoding processes. However, scenes with rapidly changing brightness levels produce strong artefacts that mislead most known scene change detection algorithms. During an encoding process, flash detection is important as it allows the encoding engine to distinguish between a real scene change and a natural luminosity change in a video sequence, and to adapt the system rate control operations accordingly.

There are flash detection methods available in the computer vision and image processing fields. However, they are complicated, expensive or difficult to be implemented in high speed real time platforms or they lack enough accuracy when used.

SUMMARY OF INVENTION

This disclosure describes methods for the detection of flashes and mechanisms to improve the compression performance under those conditions. The detection is carried out ahead of the actual coding process. Once a flash has been detected, the encoding process can be controlled to better cope with these effects. Embodiments of the invention are particularly suited to efficient implementation in low cost coder equipment although this is not a limitation of its more widespread use. The flash detection method described below exhibits both very low computational complexity and high and robust accuracy of flash detection compared with the existing and traditional flash detection methods.

In a preferred embodiment the invention is used in a video encoder implemented using Very Long Instruction Word (VLIW) digital signal processors. For example, the flash detection method described uses less than 3 percent (or 30 MIPS) of the processing power of a Texas Instruments 1 GHz TI C6415 DSP device while processing standard definition formatted video at 30 frames per second.

Alternative platform implementations of the scheme include: Asics, hardware based, field programmable gate array (FPGA) based, and general purpose programmable processor based video encoders. All these implementations would enjoy similar benefits in terms of cost/performance when compared with other flash detection methods.

Specifically the invention describes statistical means for detecting flashes using histograms of the image pixel values which provide reliable detection of flashes even when the underlying video behaviour is complex and when existing simple prior art methods can lead to unwanted false detections or failures to detect the flashes. Furthermore, embodiments of the invention apply other parameters and methods in concert with histogram data to provide an improved method of detecting flashes. A particular problem in video coding occurs when more than one mode of behaviour is present in the image and when a scene change is part of that behaviour. It is a particular object of this invention to ameliorate defects in prior art coding performance when both flashes and scene cuts may be present simultaneously.

Accordingly in a first aspect of the present invention, there is provided method of pre-processing video data to detect flashes, comprising calculating a normalized difference index value for a Luminance [Y] component of the video data, calculating a normalized difference index value for Chrominance [U and V] components of the video data, calculating a normalized luminance [Y] mean gradient index for the video data and providing an indication that a flash has been detected when all the following conditions are satisfied: the normalized difference index value for the Luminance [Y] component is greater than a first predetermined threshold ($T_Y$); the normalized difference index value for the Chrominance [U and V] components is less than a second predetermined threshold ($T_C$); and a difference between the normalized difference index value for the Chrominance [U and V] components and the normalized luminance [Y] mean gradient index is less than or equal to a third pre-determined threshold ($T_F$).

Advantageously, the method further comprises ceasing to provide an indication that a flash has been detected when either:
all of the following conditions are satisfied: the normalized difference index value for the Luminance [Y] component is greater than a fourth predetermined threshold ($T^N_Y$); the normalized difference index value for the Chrominance [U and V] components is less than a fifth predetermined threshold ($T^N_C$); and the normalized luminance [Y] mean gradient index is less than or equal to a sixth pre-determined threshold ($T_G$);
or a time period spent in the flash detected state exceeds a pre-determined time limit ($T_L$).

Advantageously, the normalized difference index value for the Luminance [Y] component is calculated over consecutive pictures i and j using the equation:

$$D_Y(H_i^Y, H_j^Y) = \frac{P_Y - \sum_{k=1}^{B} \min(H_i^Y(k), H_j^Y(k))}{P_Y}$$

wherein $P_Y$ is the total number of pixels in the luminance plane of a picture in the video data, and B is the bin number of a given histogram.

Advantageously, the normalized difference index value for Chrominance [U and V] components is calculated over consecutive pictures i and j using the equation:

$$D_C(H_i^C, H_j^C) = \frac{P_C - \sum_{k=1}^{B} \min(H_i^C(k), H_j^C(k))}{P_C}$$

wherein $P_C$ is the total number of pixels in the chrominance plane of a picture in the video data and B is the bin number of a given histogram.

Advantageously, the normalized luminance [Y] mean gradient index is calculated using the equation:

$$G_t = \frac{\nabla M(t)}{V_{max}} = \frac{(m_t - m_{t-1})}{V_{max}}$$

wherein $m_t$ is the value mean of a luminance picture at time t and $V_{max}$ is the maximal value of luminance pixels in a picture in the video data.

Advantageously, the difference between the normalized difference index value for the Chrominance [U and V] components and the normalized luminance [Y] mean gradient index is calculated using the equation:

$$D_C(H_i^C, H_j^C) - G_t$$

Advantageously, the normalized index value for the Chrominance [U and V] components are combined in the same calculation.

Advantageously, the first predetermined threshold ($T_Y$) is in the range [0, 1].

Advantageously, the second predetermined threshold ($T_C$) is in the range [0, 1].

Advantageously, the third predetermined threshold ($T_F$) is in the range [-1, 2].

Advantageously, the fourth predetermined threshold ($T^N_Y$) is in the range [0, 1].

Advantageously, the fifth predetermined threshold ($T^N_C$) is in the range [0, 1].

Advantageously, the sixth predetermined threshold ($T_G$) is in the range [0, 1].

Advantageously, the method further comprises adapting a system rate control of a subsequent video data encoding operation dependent upon the indication that a flash has been detected.

Advantageously, the method is carried out prior to a video data encoding step.

According to a second aspect of the invention, there is provided a digital signal processor adapted to carry out the method of the first aspect.

According to a third aspect of the invention, there is provided an apparatus adapted to carry out the method of the first aspect.

According to a fourth aspect of the invention, there is provided a computer readable medium, containing instructions, which, when executed by a processor, carries out the method of the first aspect.

According to a fifth aspect of the invention, there is provided a computer program adapted to carry out the method of the first aspect.

According to a sixth aspect of the invention, there is provided a method of pre-processing video data to detect flashes, comprising calculating a normalized difference index value for a Luminance [Y] component of the video data, calculating a normalized difference index value for Chrominance [U and V] components of the video data, calculating a normalized luminance [Y] mean gradient index for the video data, and transitioning to a flash detected state when all the following conditions are satisfied: the normalized difference index value for the Luminance [Y] component is greater than a first predetermined threshold ($T_Y$); the normalized difference index value for the Chrominance [U and V] components is less than a second predetermined threshold ($T_C$); and a difference between the normalized difference index value for the Chrominance [U and V] components and the normalized luminance [Y] mean gradient index is less than or equal to a third pre-determined threshold ($T_F$).

BRIEF DESCRIPTION OF THE DRAWINGS

A method of pre-processing video data will now be described, by way of example only, with reference to the accompanying drawings in which:

FIG. 1 shows an illustration of the possible states in a flash detection method according to an embodiment of the invention;

DETAILED DESCRIPTION OF THE SPECIFIC EMBODIMENT

The following describes an efficient and effective flash detection method that is based on new picture discrete histograms and luminance mean gradient criteria and measures.

The terms "picture" and "image" are synonymous in the below described method, therefore the terms may be used interchangeably.

Discrete Histograms

A histogram depicts the statistical distribution of pixel values in an image. Image pixel histograms have long been used in image processing as a basis for all kinds of applications, especially those that can be satisfactorily completed over a long sequence of contiguous images, and they are very good as a means of indicating a difference measure between two pictures. For example, a sudden change in such a measure might be taken as a reliable indication of a scene change. However, a light flashing or certain special lighting effects also change the full histogram of a picture dramatically, which makes it almost impossible to distinguish a light flash from a scene change using normal simple methods based on picture histograms.

In an embodiment of the invention, the three separated luminance [Y] and chrominance [U and V] histograms are obtained and then used to calculate a Normalized Difference Index (NDI) defined by the following two equations:

$$D_Y(H_i^Y, H_j^Y) = \frac{P_Y - \sum_{k=1}^{B} \min(H_i^Y(k), H_j^Y(k))}{P_Y} \quad (1)$$

Equation (1) is the Normalised Difference Index of the luminance histogram, and it is applied to the luminance [Y] component.

$$D_C(H_i^C, H_j^C) = \frac{P_C - \sum_{k=1}^{B} \min(H_i^C(k), H_j^C(k))}{P_C} \quad (2)$$

Equation (2) is the Normalised Difference Index of the chrominance histogram, and it is applied to the Chrominance [U and V] components, where the data about both the U and V components are combined in the same calculation.

$P_Y$ and $P_C$ are the total numbers of pixels in the luminance and chrominance planes of a picture respectively and B is the bin number of a given histogram.

$H^Y_i(k)$ is the histogram value in bin k for the i'th frame or field of a video sequence and similarly $H^Y_j(k)$ is the corresponding histogram bin content for the j'th frame or field. Both equations show a calculation that takes the minimum of the two corresponding values of the histograms for the i'th and j'th frames or fields in bin index k and sums these minimum values over the whole histogram. This sum is then normalised to the total number of luminance or chrominance values in the image frame or field.

The normalized difference index (NDI) thus calculated is the area difference between the two histograms representing the consecutive pictures i and j. The NDI values have the range [0, 1] where 0 means that the compared two histograms have no difference and 1 represents the case where the two histograms have no common area at all.

Both normalized difference indices are used in the condition testing described below with reference to FIG. 1.

Normalized Luminance Mean Gradient Index

Frequently changes in the average values of luminance and chrominance of a picture are used in image pre-processing for scene change detection, flash detection and other image processing functions. However, such simple means prove to be unreliable in practice and require improvement.

Accordingly, an embodiment of the present invention utilises the statistical luminance mean value of the picture of interest, and adds a time dimension to the change direction of the mean value to detect flashes.

The algorithm described here uses a Normalized Luminance Mean Gradient Index (NLMGI) defined as follows in equation 3:

$$G_t = \frac{\nabla M(t)}{V_{max}} = \frac{(m_t - m_{t-1})}{V_{max}} \quad (3)$$

Where $m_t$ is the value mean of a luminance picture at time t and $V_{max}$ is the maximal value of luminance pixels in the picture.

The values of the NLMGI occupy the range [−1, 1]. The positive range represents a luminance increase and its relative magnitude and the negative range depicts the luminance decrease and magnitude, while 0 indicates there is no change in luminance mean value.

Flash Detection Scheme:

The flash detection method according to an embodiment of the invention is based upon the previously introduced criteria and measures, namely the Normalized Difference Indices, and the Normalized Luminance Mean Gradient Index. Typically, the flash detection method will be carried out by a flash detection module of an encoder.

There are two states in the flash detection module: NORMAL and FLASH as illustrated by FIG. 1. The flash detection module starts in the NORMAL state with the normal video sequence input. The module will transition to the FLASH state when the following Condition 1 is met (and hence a flash is considered to be detected):

Condition 1:

a. $D_Y(H^Y_i, H^Y_j) > T_Y$ where $T_Y$ is a pre-set threshold; (4)

b. $D_C(H^C_i, H^C_j) < T_C$ where $T_C$ is a pre-set threshold; (5)

c. $F = D_C(H^C_i, H^C_j) - G_t \leq T_F$ where $T_F$ is a pre-set threshold; (6)

The thresholds $T_Y$ and $T_C$ have the range [0, 1]. The threshold $T_F$ has the range [−1, 2]. The exact threshold values used will depend upon a user's desired operating characteristics for the flash detection. This will be based upon a variety of parameters, such as the type of video data being encoded (the typical amount of, duration, size, etc, of the flashes in a particular video) or the performance required by a user (speed of execution, and the like). Condition 1 is met when all of sub-conditions a, b and c are satisfied.

Meanwhile, once the flash detection module is in the FLASH State, the module will transition from the FLASH state to the NORMAL state when the following Condition 2 is met:

Condition 2:

d. $D_Y(H^Y_i, H^Y_j) > T^N_Y$ where $T^N_Y$ is a pre-set threshold; (7)

e. $D_C(H^C_i, H^C_j) < T^N_C$ where $T^N_C$ is a pre-set threshold; (8)

f. $G_t \leq T_G$ where $T_G$ is a pre-set threshold; (9)

g. Or the period staying in FLASH state has exceeded a given time limit. (10)

The thresholds $T^N_Y$, $T^N_C$ and $T_G$ all have the range [0, 1]. Again, the exact threshold values used will depend on the desired operating characteristics of the flash detection method/module.

For condition 2, it is satisfied when either all of the sub-conditions d, e and f are satisfied, or the time limit of sub-condition g expires. Accordingly, there is a time out after which it is assumed that the flash has ended.

It will be appreciated that the disclosed flash detection method maybe implemented in a number of different ways, including both hardware specifically programmed to carry out the method, or as software for execution by a more general purpose processor. Therefore, implementations include the method executing on Digital Signal Processors (DSPs), Field Programmable Gate Array (FPGAs), general purpose processors or Application Specific Integrated Circuits (ASICs).

The flash detection method maybe utilised in the encoder or transcoder of any video capable device, including, but not limited to: set top boxes, digital recorders (HDD, DVD-R/RW, Blu-RAY, HD-DVD), personal digital assistants, mobile telephones, computers (PCs), games consoles, digital televisions, and the like.

The invention claimed is:

1. A method of pre-processing video data to detect flashes, comprising:
calculating a normalized difference index value for a Luminance [Y] component of the video data;
calculating a normalized difference index value for Chrominance [U and V] components of the video data;
calculating a normalized luminance [Y] mean gradient index for the video data, wherein the normalized luminance [Y] mean gradient index is calculated by:

$$G_t = \frac{\nabla M(t)}{V_{max}} = \frac{(m_t - m_{t-1})}{V_{max}}$$

wherein $m_t$ is the value mean of a luminance picture at time t, $V_{max}$ is the maximal value of luminance pixels in a picture in the video data, $G_t$ is the normalized luminance [Y] mean gradient index, and $\Delta M(t)$ is the difference between $m_t$ and $m_{t-1}$; and providing an indication that a flash has been detected when all the following conditions are satisfied:
the normalized difference index value for the Luminance [Y] component is greater than a first predetermined threshold ($T_Y$);
the normalized difference index value for the Chrominance [U and V] components is less than a second predetermined threshold ($T_C$); and
a difference between the normalized difference index value for the Chrominance [U and V] components and the normalized luminance [Y] mean gradient index is less than or equal to a third pre-determined threshold ($T_F$).

2. The method of claim 1, further comprising:
ceasing to provide an indication that a flash has been detected when:
either all of the following conditions are satisfied:
the normalized difference index value for the Luminance [Y] component is greater than a fourth predetermined threshold ($T^N_Y$);
the normalized difference index value for the Chrominance [U and V] components is less than a fifth predetermined threshold ($T^N_C$); and
the normalized luminance [Y] mean gradient index is less than or equal to a sixth pre-determined threshold ($T_G$);
or a time period spent in the flash detected state exceeds a pre-determined time limit ($T_L$).

3. The method of claim 1, wherein the normalized difference index value for the Luminance [Y] component is calculated over consecutive pictures i and j using the equation:

$$D_Y(H_i^Y, H_j^Y) = \frac{P_Y - \sum_{k=1}^{B} \min(H_i^Y(k), H_j^Y(k))}{P_Y}$$

wherein $P_Y$ is the total number of pixels in the luminance plane of a picture in the video data, $D_Y$ is the normalized difference index value for the Luminance [Y] component, $H^Y_i$ is a histogram value for an ith frame or field of a video sequence, $H^Y_j$ is a histogram value for an jth frame or field of a video sequence, $H^Y_i(k)$ is a histogram value in bin k for a ith frame or field of a video sequence $H^Y_j(k)$ is a histogram value in bin k for a jth frame or field of a video sequence, and B is the bin number of a given histogram.

4. The method of claim 1, wherein the normalized difference index value for Chrominance [U and V] components is calculated over consecutive pictures i and j using the equation:

$$D_C(H_i^C, H_j^C) = \frac{P_C - \sum_{k=1}^{B} \min(H_i^C(k), H_j^C(k))}{P_C}$$

wherein $P_C$ is the total number of pixels in the chrominance plane of a picture in the video data $D_C$ is the normalized difference index value for the chrominance [U and V] component, $H^C_i$ is a histogram value for an ith frame or field of a video sequence, $H^C_j$ is a histogram value for a jth frame or field of a video sequence, $H^C_i(k)$ is a histogram value in bin k for an ith frame or field of a video sequence, $H^C_j(k)$ is a histogram value in bin k for a jth frame or field of a video sequence, and B is the bin number of a given histogram.

5. The method of claim 4, wherein the normalized index value for the Chrominance [U and V] components are combined in the same calculation.

6. The method of claim 1 wherein the first predetermined threshold is in the range [0, 1].

7. The method of claim 1 wherein the second predetermined threshold is in the range [0, 1].

8. The method of claim 1 wherein the third predetermined threshold is in the range [−1, 2].

9. The method of claim 1 wherein the fourth predetermined threshold is in the range [0, 1].

10. The method of claim 1 wherein the fifth predetermined threshold is in the range [0, 1].

11. The method of claim 1 wherein the sixth predetermined threshold is in the range [0, 1].

12. The method of claim 1, further comprising:
adapting a system rate control of a subsequent video data encoding operation dependent upon the indication that a flash has been detected.

13. The method of claim 1, wherein the method is carried out prior to a video data encoding step.

14. A digital signal processor adapted to carry out the method of claim 1.

15. An apparatus adapted to carry out the method of claim 1.

16. A non-transitory computer readable medium, containing instructions, which, when executed by a processor, carries out the method of claim 1.

17. A method of pre-processing video data to detect flashes, comprising:
calculating a normalized difference index value for a Luminance [Y] component of the video data;
calculating a normalized difference index value for Chrominance [U and V] components of the video data;
calculating a normalized luminance [Y] mean gradient index for the video data, wherein the normalized luminance [Y] mean gradient index is calculated by:

$$G_t = \frac{\nabla M(t)}{V_{max}} = \frac{(m_t - m_{t-1})}{V_{max}}$$

wherein $m_t$ is the value mean of a luminance picture at time t, $V_{max}$ is the maximal value of luminance pixels in a picture in the video data, and $\Delta M(t)$ is the difference between $m_t$ and $m_{t-1}$; and
transitioning to a flash detected state when all the following conditions are satisfied:
the normalized difference index value for the Luminance [Y] component is greater than a first predetermined threshold ($T_Y$);
the normalized difference index value for the Chrominance [U and V] components is less than a second predetermined threshold ($T_C$); and
a difference between the normalized difference index value for the Chrominance [U and V] components and the normalized luminance [Y] mean gradient index is less than or equal to a third pre-determined threshold ($T_F$).

* * * * *